United States Patent
Lin (10) Patent No.: US 9,116,412 B2
(45) Date of Patent: Aug. 25, 2015

(54) COLOR DISPLAY ARCHITECTURE AND DRIVING METHODS

(71) Applicant: SiPix Imaging, Inc., Fremont, CA (US)

(72) Inventor: Craig Lin, San Jose, CA (US)

(73) Assignee: E Ink California, LLC, Fremont, CA (US)

(*) Notice: Subject to any disclaimer, the term of this patent is extended or adjusted under 35 U.S.C. 154(b) by 0 days.

(21) Appl. No.: 14/195,679

(22) Filed: Mar. 3, 2014

(65) Prior Publication Data

US 2014/0177031 A1    Jun. 26, 2014

Related U.S. Application Data

(63) Continuation-in-part of application No. 13/115,899, filed on May 25, 2011, now Pat. No. 8,704,756.

(60) Provisional application No. 61/348,570, filed on May 26, 2010.

(51) Int. Cl.
*G02B 26/00* (2006.01)
*G02F 1/03* (2006.01)
(Continued)

(52) U.S. Cl.
CPC ........... *G02F 1/167* (2013.01); *G02B 26/00* (2013.01); *G02B 26/02* (2013.01); *G02B 26/026* (2013.01); *G09G 3/34* (2013.01); *G09G 3/344* (2013.01); *G02F 2001/1672* (2013.01); *G02F 2001/1678* (2013.01); *G02F 2203/34* (2013.01); *G09F 9/372* (2013.01); *G09G 2300/0439* (2013.01);
(Continued)

(58) Field of Classification Search
CPC ...... G02B 26/00; G02B 26/02; G02B 26/026; G09F 9/372; G02F 1/167; G02F 2001/1672; G02F 2001/1678; G02F 2203/34; G09G 3/001; G09G 3/34; G09G 3/344; G09G 3/3446; G09G 5/00; G09G 2300/0439; G09G 2320/022
USPC ............ 359/228, 245, 253, 296; 345/76, 107, 345/211, 212, 690, 691; 204/600
See application file for complete search history.

(56) References Cited

U.S. PATENT DOCUMENTS

| 3,756,693 A | 9/1973 | Ota |
| 3,892,568 A | 7/1975 | Ota |

(Continued)

FOREIGN PATENT DOCUMENTS

| JP | 2009-116041 | 5/2009 |
| JP | 2009-192637 | 8/2009 |

(Continued)

OTHER PUBLICATIONS

U.S. Appl. No. 14/242,793, Apr. 1, 2014, Wang et al.

*Primary Examiner* — Loha Ben
(74) *Attorney, Agent, or Firm* — Perkins Coie LLP (57) ABSTRACT

The invention relates to a method for driving a display cell filled with an electrophoretic fluid comprising two types of charged particles carrying opposite charge polarities and of two contrast colors, wherein the two types of pigment particles are dispersed in a solvent of a color or in a solvent with non-charged or slightly charged colored particles dispersed therein. The method comprises driving said display cell to display the color of the solvent or the color of the non-charged or slightly charged colored particles by applying a driving voltage which is about 1 to about 20% of the full driving voltage.

10 Claims, 8 Drawing Sheets

(51) Int. Cl.
*G09G 3/34* (2006.01)
*G02F 1/167* (2006.01)
*G02B 26/02* (2006.01)
*G09F 9/37* (2006.01)

(52) U.S. Cl.
CPC ............... *G09G 2320/0223* (2013.01); *G09G 2320/0242* (2013.01)

(56) References Cited

U.S. PATENT DOCUMENTS

| | | | |
|---|---|---|---|
| 4,298,448 A | 11/1981 | Muller et al. | |
| 5,378,574 A | 1/1995 | Winnik et al. | |
| 5,980,719 A | 11/1999 | Cherukuri et al. | |
| 6,198,809 B1 | 3/2001 | Disanto et al. | |
| 6,337,761 B1 | 1/2002 | Rogers et al. | |
| 6,373,461 B1 | 4/2002 | Hasegawa et al. | |
| 6,486,866 B1 | 11/2002 | Kuwahara et al. | |
| 6,517,618 B2 | 2/2003 | Foucher et al. | |
| 6,525,866 B1 | 2/2003 | Lin et al. | |
| 6,538,801 B2 | 3/2003 | Jacobson et al. | |
| 6,600,534 B1 | 7/2003 | Tanaka et al. | |
| 6,650,462 B2 | 11/2003 | Katase | |
| 6,680,726 B2 | 1/2004 | Gordon et al. | |
| 6,693,620 B1 | 2/2004 | Herb et al. | |
| 6,704,133 B2 | 3/2004 | Gates et al. | |
| 6,724,521 B2 | 4/2004 | Nakao et al. | |
| 6,729,718 B2 | 5/2004 | Goto et al. | |
| 6,751,007 B2 | 6/2004 | Liang et al. | |
| 6,829,078 B2 | 12/2004 | Liang et al. | |
| 6,864,875 B2 | 3/2005 | Drzaic et al. | |
| 6,900,924 B2 * | 5/2005 | Goden | 359/296 |
| 6,947,203 B2 | 9/2005 | Kanbe | |
| 6,967,762 B2 | 11/2005 | Machida et al. | |
| 6,987,503 B2 | 1/2006 | Inoue | |
| 6,987,605 B2 | 1/2006 | Liang et al. | |
| 7,009,756 B2 | 3/2006 | Kishi et al. | |
| 7,019,889 B2 | 3/2006 | Katase | |
| 7,034,987 B2 | 4/2006 | Schlangen | |
| 7,038,655 B2 | 5/2006 | Herb et al. | |
| 7,046,228 B2 | 5/2006 | Liang et al. | |
| 7,050,218 B2 | 5/2006 | Kanbe | |
| 7,057,600 B2 | 6/2006 | Goden | |
| 7,057,798 B2 | 6/2006 | Ukigaya | |
| 7,075,502 B1 | 7/2006 | Drzaic et al. | |
| 7,226,550 B2 | 6/2007 | Hou et al. | |
| 7,259,744 B2 | 8/2007 | Arango et al. | |
| 7,271,947 B2 | 9/2007 | Liang et al. | |
| 7,283,119 B2 | 10/2007 | Kishi | |
| 7,312,916 B2 | 12/2007 | Pullen et al. | |
| 7,342,556 B2 | 3/2008 | Oue et al. | |
| 7,352,353 B2 | 4/2008 | Albert et al. | |
| 7,365,732 B2 | 4/2008 | Matsuda et al. | |
| 7,411,719 B2 | 8/2008 | Paolini et al. | |
| 7,417,787 B2 | 8/2008 | Chopra et al. | |
| 7,420,549 B2 | 9/2008 | Jacobson et al. | |
| 7,474,295 B2 * | 1/2009 | Matsuda | 345/107 |
| 7,502,162 B2 | 3/2009 | Lin et al. | |
| 7,545,557 B2 | 6/2009 | Iftime et al. | |
| 7,548,291 B2 | 6/2009 | Lee et al. | |
| 7,557,981 B2 | 7/2009 | Liang et al. | |
| 7,652,656 B2 | 1/2010 | Chopra et al. | |
| 7,679,599 B2 | 3/2010 | Kawai | |
| 7,686,463 B2 | 3/2010 | Goto | |
| 7,760,419 B2 | 7/2010 | Lee | |
| 7,782,292 B2 | 8/2010 | Miyasaka et al. | |
| 7,808,696 B2 | 10/2010 | Lee et al. | |
| 7,830,592 B1 | 11/2010 | Sprague et al. | |
| 7,852,547 B2 | 12/2010 | Kim | |
| 7,852,548 B2 | 12/2010 | Roh | |
| 7,911,681 B2 | 3/2011 | Ikegami et al. | |
| 7,982,941 B2 | 7/2011 | Lin et al. | |
| 8,072,675 B2 | 12/2011 | Lin et al. | |
| 8,115,729 B2 | 2/2012 | Danner et al. | |
| 8,120,838 B2 | 2/2012 | Lin et al. | |
| 8,159,636 B2 | 4/2012 | Sun et al. | |
| 8,164,823 B2 | 4/2012 | Ikegami et al. | |
| 8,169,690 B2 | 5/2012 | Lin et al. | |
| 8,174,492 B2 | 5/2012 | Kim et al. | |
| 8,237,892 B1 | 8/2012 | Sprague et al. | |
| 8,355,196 B2 | 1/2013 | Yan et al. | |
| 8,390,918 B2 * | 3/2013 | Wilcox et al. | 359/296 |
| 8,395,836 B2 | 3/2013 | Lin et al. | |
| 8,422,116 B2 | 4/2013 | Sprague et al. | |
| 8,466,852 B2 | 6/2013 | Drzaic et al. | |
| 8,477,405 B2 | 7/2013 | Ishii et al. | |
| 8,520,296 B2 | 8/2013 | Wang et al. | |
| 8,570,272 B2 | 10/2013 | Hsieh et al. | |
| 8,605,354 B2 | 12/2013 | Zhang et al. | |
| 8,704,756 B2 * | 4/2014 | Lin | 345/107 |
| 8,717,664 B2 * | 5/2014 | Wang et al. | 359/296 |
| 8,730,278 B2 * | 5/2014 | Yamakita | 345/690 |
| 2006/0023296 A1 | 2/2006 | Whitesides et al. | |
| 2007/0002008 A1 | 1/2007 | Tam | |
| 2007/0080928 A1 | 4/2007 | Ishii et al. | |
| 2007/0273637 A1 | 11/2007 | Zhou et al. | |
| 2008/0042928 A1 | 2/2008 | Schlangen et al. | |
| 2008/0174531 A1 | 7/2008 | Ash | |
| 2009/0213452 A1 | 8/2009 | Lin et al. | |
| 2010/0103502 A1 | 4/2010 | Jacobson et al. | |
| 2010/0165005 A1 | 7/2010 | Sprague | |
| 2010/0165448 A1 | 7/2010 | Sprague | |
| 2010/0283804 A1 | 11/2010 | Sprague et al. | |
| 2010/0289838 A1 | 11/2010 | Markvoort et al. | |
| 2011/0199671 A1 | 8/2011 | Amundson et al. | |
| 2011/0217639 A1 | 9/2011 | Sprague | |
| 2011/0234557 A1 | 9/2011 | Yang et al. | |
| 2011/0261433 A1 | 10/2011 | Sprague et al. | |
| 2011/0286076 A1 | 11/2011 | Lin et al. | |
| 2012/0007897 A1 | 1/2012 | Yang et al. | |
| 2012/0307346 A1 | 12/2012 | Sprague | |
| 2013/0057942 A1 | 3/2013 | Wang et al. | |
| 2013/0176612 A1 | 7/2013 | Sprague et al. | |
| 2013/0208338 A1 | 8/2013 | Wang et al. | |
| 2014/0011913 A1 | 1/2014 | Du et al. | |
| 2014/0022624 A1 | 1/2014 | Yang et al. | |
| 2014/0055840 A1 | 2/2014 | Zang et al. | |
| 2014/0078036 A1 | 3/2014 | Zhang et al. | |
| 2014/0092466 A1 | 4/2014 | Wang et al. | |

FOREIGN PATENT DOCUMENTS

| | | |
|---|---|---|
| KR | 10-2007-0082680 | 8/2007 |
| KR | 10-2008-0023913 | 3/2008 |
| WO | WO 99/53373 | 10/1999 |
| WO | WO 03/016993 | 2/2003 |

* cited by examiner

COLOR DISPLAY ARCHITECTURE AND DRIVING METHODS

This is a continuation-in-part of U.S. patent application Ser. No. 13/115,899, filed May 25, 2011; which claims the benefit of U.S. Provisional Application No. 61/348,570, filed May 26, 2010; the contents of both applications are incorporated herein by reference in their entirety.

FIELD OF THE INVENTION

The present invention is directed to a color display and methods for driving such displays.

BACKGROUND OF THE INVENTION

In order to achieve a color display, color filters are often used. The most common approach is to add color filters on top of black/white sub-pixels of a pixellated display to display the red, green and blue colors. When a red color is desired, the green and blue sub-pixels are turned to the black state so that the only color displayed is red. When the black state is desired, all three-sub-pixels are turned to the black state. When the white state is desired, the three sub-pixels are turned to red, green and blue, respectively, and as a result, a white state is seen by the viewer.

The most significant disadvantage of such a technique is that since each of the sub-pixels has a reflectance of about one third ($1/3$) of the desired white state, the white state is fairly dim. To compensate for this, a fourth sub-pixel may be added which can display only the black or white state, so that the white level is doubled at the expense of the red, green or blue color level (where each sub-pixel is only one fourth [$1/4$] of the area of the pixel). Brighter colors can be achieved by adding light from the white pixel, but this is achieved at the expense of color gamut to cause the colors to be very light and unsaturated. A similar result can be achieved by reducing the color saturation of the three sub-pixels. Even with that, the white light level is normally substantially less than half of that of a black and white display, rendering it an unacceptable choice for display devices, such as e-readers or displays that need well readable black-white brightness and contrast.

An alternative technique utilizing a dual switching mode is proposed in U.S. Pat. No. 7,046,228. In this patent, each pixel is formed of three sub-pixels, each one of which is a display cell filled with a display fluid of an appropriate color (e.g., red, green or blue) with charged white particles dispersed in a colored solvent and a dual switching mode. With the dual switching mode, an extra set of electrodes are added to each display cell so that the display cell can be switched into three states: white (with the particles at top), colored (with the particles at bottom), and black (with the particles moved to the sides). A black background layer is used so that when the particles moved sideways, the black state is seen. The advantage of this is that high quality white and black states can be achieved while still offering red/green/blue colors. This dual mode design requires a special circuitry structure within each sub-pixel, which may reduce backplane yield and affect costs. In addition, a masking layer may be required to block light reflected by the white sub-pixels in the black state to maintain the desired contrast.

SUMMARY OF THE INVENTION

One aspect of the present invention is directed to a method for driving a display cell filled with an electrophoretic fluid comprising two types of charged particles carrying opposite charge polarities and of two contrast colors wherein the two types of charged particles are dispersed in a solvent of a color, which method comprises driving said display cell to a color state which color is the color of the solvent by applying a driving voltage which is about 1 to about 20% of the full driving voltage.

In one embodiment, the two types of pigment particles are white and black charged particles carrying opposite charge polarities.

In one embodiment, the color of the solvent is red, green or blue.

In one embodiment, the two types of charged particles have different degrees of mobility. In another embodiment, the two types of charged particles have similar mobility.

In one embodiment, the display cell is microcup-based. In another embodiment, the display cell is microcapsule-based.

In one embodiment, the solvent is of the same color in all display cells. In another embodiment, the solvent is of different colors in display cells.

In another aspect, the present invention is directed to a method for driving a color display comprising display cells sandwiched between a common electrode and pixel electrodes, wherein each of the display cells is filled with an electrophoretic fluid comprising two types of charged particles and one type of non-charged or slightly charged colored particles dispersed in a solvent, wherein the two types of charged particles carry opposite charge polarities and are of two contrast colors. The method comprises applying a driving voltage between the common electrode and a pixel electrode to drive the electrophoretic fluid in an area corresponding to the pixel electrode to display the color of the non-charged or slightly charged colored particles, wherein the driving voltage is 1 to 20% of a full driving voltage required to drive the two types of charged particles to be near or at the common electrode or the pixel electrodes.

DETAILED DESCRIPTION OF THE INVENTION

Figure 1A:
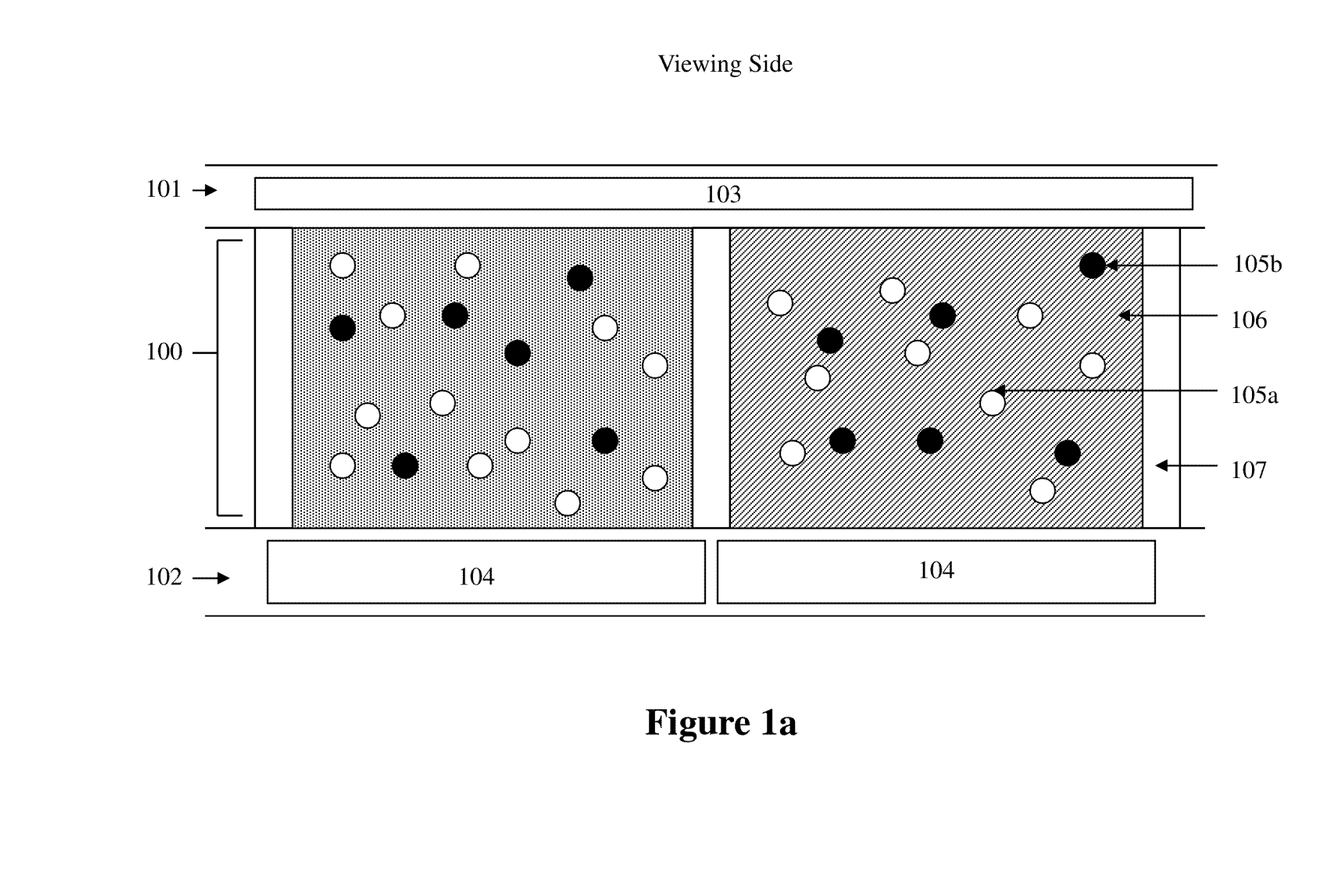
FIGS. 1a and 1b depict a cross-section view of color display devices of the present invention.
Figure 1B:
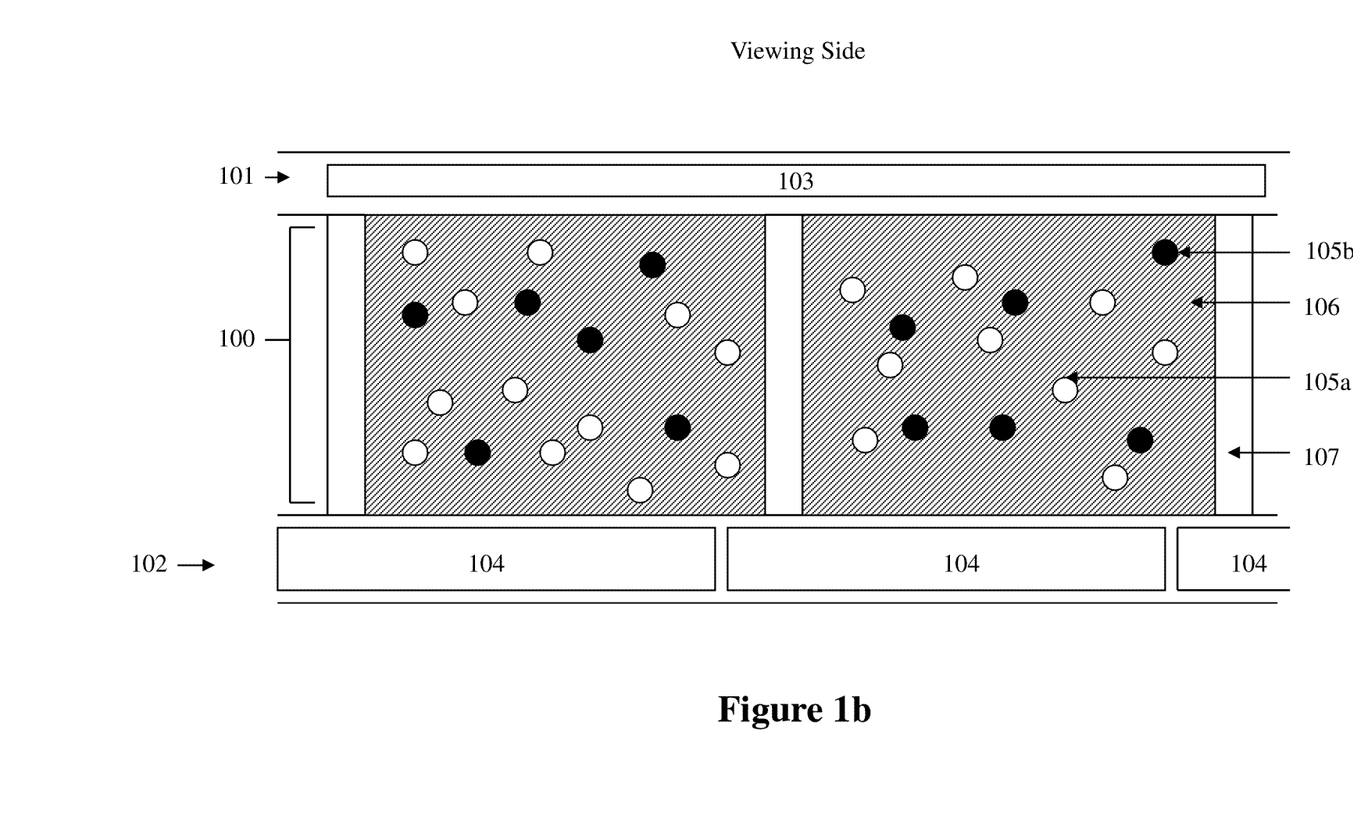

FIGS. 1a and 1b depict a cross-section view of a color display device of the present invention. A display cell (100) is sandwiched between a first layer (101) and a second layer (102). The display cell (100) is surrounded by partition walls (107). The first layer comprises a common electrode (103). The second layer comprises pixel electrodes (104).

The display cells of the present invention are filled with an electrophoretic fluid which comprises two type of pigment particles (105a and 105b) dispersed in a solvent or solvent mixture (106). The two types of pigment particles are of contrast colors and oppositely charged. The electrophoretic fluid (or the solvent or solvent mixture in which the pigment particles are dispersed) may be colored (e.g., red, green or blue).

The common electrode (103) is usually a transparent electrode layer (e.g., ITO), spreading over the entire top of the display device.

The second layer (102) comprises pixel electrodes (104). The pixel electrode (104) may be an active matrix driving electrode. However, the scope of the present invention encompasses other types of electrode addressing such as passive matrix driving, as long as the electrodes serve the desired functions.

In one embodiment of the present invention, in all of the display cells, the two types of particles are dispersed in a dielectric solvent of the same color. In this case, the display cells (100) do not have to be aligned with the pixel electrodes (104), as shown in FIG. 1b.

In another embodiment, the two types of particles are dispersed in a dielectric solvent of different colors in different display cells. For example, in one group of the display cells, the two types of the particles are dispersed in a red dielectric solvent and in another group of the display cells, the two types of the particles are dispersed in a blue dielectric solvent. In such a case, the display cells (100) must be aligned with the pixel electrodes (104).

The display cells may be of a conventional walled or partition type, a microencapsulated type or a microcup type. In the microcup type, the electrophoretic display cells may be sealed with a sealing layer, and there may also be an adhesive layer between the electrophoretic display cells and the common electrode.

The term "display cell" therefore is intended to refer to a micro-container which is individually filled with a display fluid. Examples of "display cell" include, but are not limited to, microcups, microcapsules, micro-channels, other partition-typed display cells and equivalents thereof.

The term "driving voltage" is used in this application to refer to the voltage potential difference experienced by the charged pigment particles in the area corresponding to a pixel electrode; i.e., the potential difference between the voltage applied to the common electrode and the voltage applied to the pixel electrode. For example, when no voltage is applied to a common electrode and a voltage of positive 15V is applied to a pixel electrode, the "driving voltage" in the area corresponding to the pixel electrode would be positive 15V. Similarly, when no voltage is applied to a common electrode and a voltage of negative 15V is applied to a pixel electrode, the driving voltage, in this case, would be negative 15V.

Figure 2A:
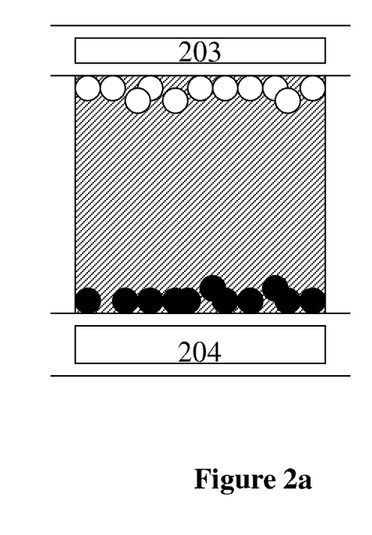
FIGS. 2a and 2b illustrate the operation of a display device of the present invention.
Figure 2B:
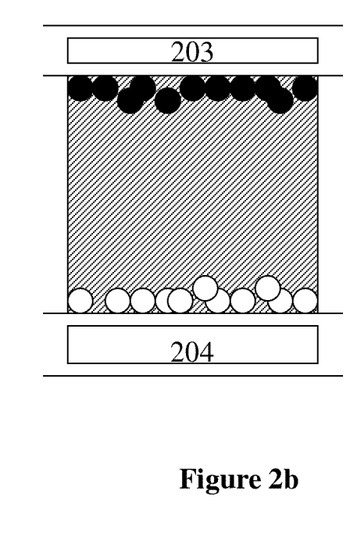

FIGS. 2a and 2b illustrate the operation of a display device of the present invention. For illustration purpose, it is assumed that the two types of pigment particles are positively charged white particles and negatively charged black particles and the two types of the particles are dispersed in a red solvent.

In FIG. 2a, there is a positive driving voltage between the common electrode (203) and the pixel electrode (204). As a result, the positively charged white particle would move to be near or at the common electrode (203) and the negatively charged black particles would move to be near or at the pixel electrode (204), causing a white color to be seen at the viewing side.

In FIG. 2b, there is a negative driving voltage between the common electrode (203) and the pixel electrode (204). As a result, the negatively charged black particle would move to be near or at the common electrode (203) and the positively charged white particles would move to be near or at the pixel electrode (204), causing a black color to be seen at the viewing side.

Figure 3:
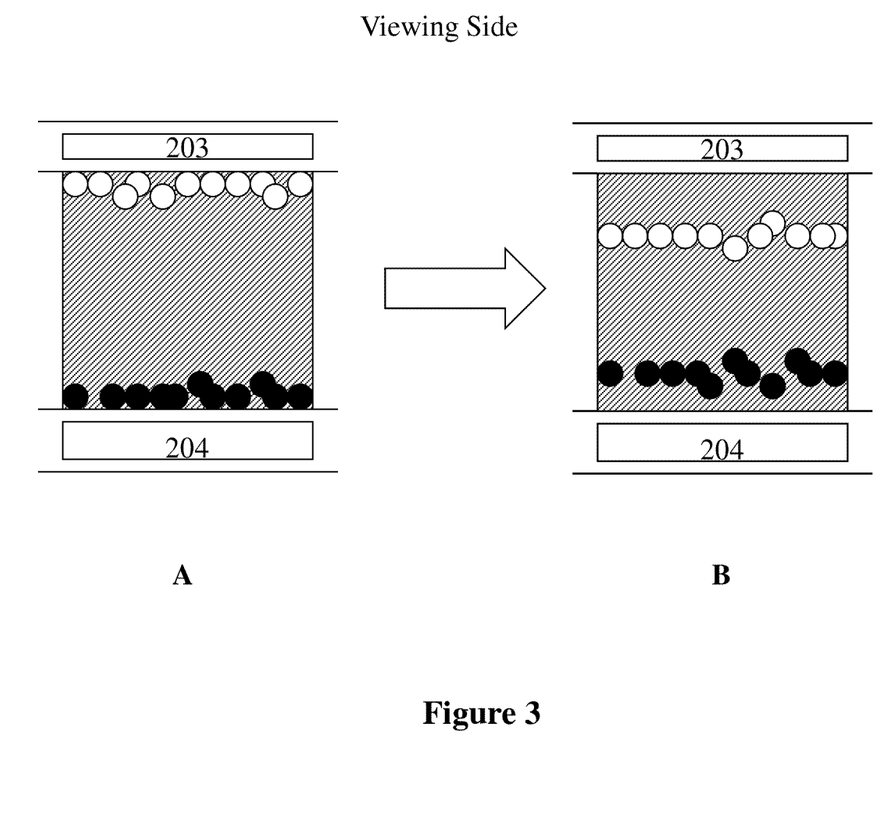
FIG. 3 illustrates how the red color state may be displayed.

FIG. 3 illustrates how the red color state may be displayed. In driving to the red color state, the sequence may start at A (same as FIG. 2a) where the positively charged white particles are at the top and the negatively charged black particles are at the bottom. This is then followed by applying a "low negative driving voltage", in B, to move the positively charged white particles away from the top and towards the middle of the display cell, as shown. The incoming light, in this case, passes through the red fluid first and then is reflected by the white pigment particles; therefore the incoming light in fact passes through the red fluid twice (on its way in and out). A more intense red color is therefore seen from the viewing side.

In the context of the present invention, the driving voltage required to drive the two types of pigment particles to the two extremes (top and bottom, respectively) are referred to as the full driving voltage. The low driving voltage referred to above is typically about 1% to about 20% of the full driving voltage. For example, if it takes a driving voltage of positive 15V to achieve the state of FIG. 2a, the driving voltage required to achieve the state of FIG. 3 may only be positive 0.15V to 3V.

It has been found that the driving voltage within the range indicated above has surprising advantages. For example, the pigment particles can be uniformly arranged at the middle level of the display cell, leading to a uniform color state.

Any higher driving voltage outside the range applied in B of FIG. 3, with a shorter duration, would result in particles moving non-uniformly. In other words, some pigment particles may stay at the top while others are scattering in different positions inside the display cell. Such a scenario will result in a color state with non-uniformity and less saturated (i.e., washed-out color).

In FIG. 3, due to the mobility difference between the white particles and the black particles, the black particles in B are barely moving when transition from A to B.

The mobility of the pigment particles is predominantly determined by the strength of the charge that the particles carry and the mass of the particles. The stronger the charge, the faster the particles will move. The strength of the charge carried by the particles often is determined by the material from which the particles are formed.

As to the mass, the lower the mass of the particles, the faster they move. For example, smaller particles having a low density would move faster than larger ones having a high density. Other factors which may influence the mobility of particles are known to a person skilled in the art.

Figure 4:
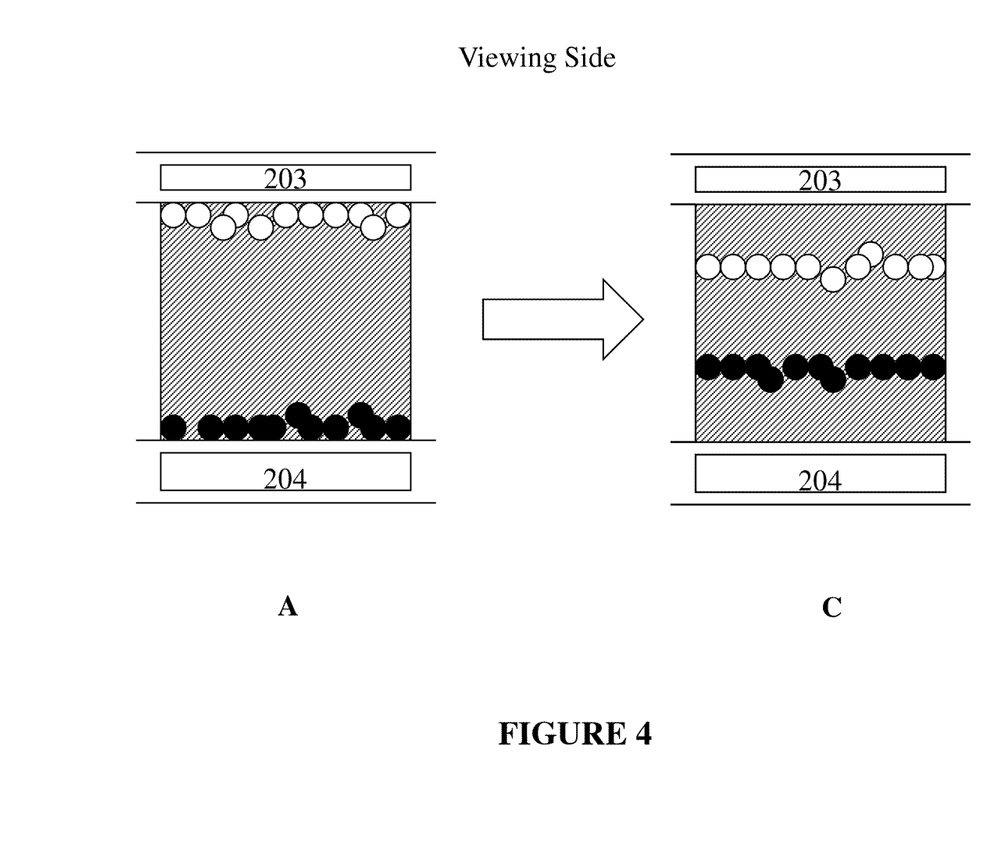
FIG. 4 illustrates an alternative design of FIG. 3.

FIG. 4 illustrates an alternative of FIG. 3. In FIG. 4, the positively charged white particles and the negatively charged black particles have similar mobility. Therefore when a low driving voltage is applied in C, the black particles also move away from the bottom of the display cell and towards the middle of the display cell. In this case, a uniform red color can also be achieved.

As stated above, the two types of pigment particles may be dispersed in a solvent of the same color in all display cells.

In another embodiment, the display cells may be filled with an electrophoretic fluid comprising two types of pigment particles dispersed in solvent of different colors (e.g., red, green and blue). In this case, each display cell represents a sub-pixel, leading to a multiple color display.

Alternatively, the colored solvent or solvent mixture in which the charged particles are dispersed may be replaced with a clear and colorless solvent having non-charged or slightly charged colored particles dispersed therein. The non-charged or slightly charged colored particles may have a zeta potential of less than 20.

The non-charged or slightly charged colored particles may be red, green, blue or of any non-white and non-black colors.

The non-charged or slightly charged color particles are substantially transparent and the color transparency comes from the refractive index similarity between the colored particles and the solvent in which the particles are dispersed.

If the refractive index of the non-charged or slightly charged color particles is not matched to that of the solvent in which the particles are dispersed, the particles may scatter light in the display medium. In order to eliminate problems associated with the mismatch of the refractive indices, the size of the non-charged or slightly charged color particles is preferably in the nanometer range, more preferably less than 100 nanometers. Materials for this type of non-charged or slightly charged colored particles may include, but are not limited to, commercially available colorants used in the LCD industry for color filter applications, such as Clariant's Hostaperm Red D2B-COF VP 3781 (i.e., red 254) which is in the class of diketopyrrolopyrrole, Hostaperm Blue E3R-COF VP3573 (i.e., blue 15:6) which is in the class of phthalocyanine, or Hostaperm Violet RL-COF O2 VP3101 (i.e., violet 23) which is in the class of dioxazine.

In another embodiment, the non-charged or slightly charged color particles may have a transparent polymeric matrix, with dye molecules solubilized therein. Since it is easier to match the refractive indices of a polymer matrix and the surrounding fluid medium, the size of the particles does not need to be tightly controlled. Examples of this type of non-charged or slightly charged colored particles may include, but are not limited to, dyed polymeric microparticles supplied by Merck Chemicals Ltd.; dyed polystyrene particles supplied by Spherotech Inc. or the like. For the colored particles with a transparent polymeric matrix, the dye soluble therein is much more dilute and adjustable. For example, the concentration of the red dye in the red particles may be adjusted to allow only the blue or green colors to be absorbed and the red color to pass through. With a white background to reflect the red color, the red color brightness can be maximized.

Figure 5A:
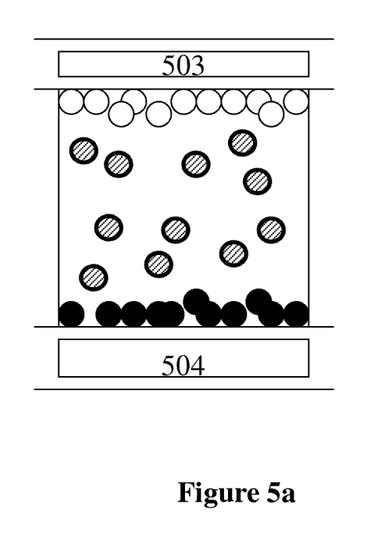
FIGS. 5a and 5b illustrate an alternative embodiment of the present invention.
Figure 5B:
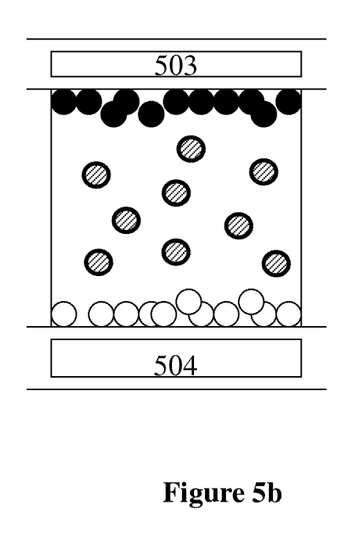

FIGS. 5a and 5b illustrate the operation of this embodiment of the present invention. For illustration purpose, it is assumed that the two types of charged particles are positively charged white particles and negatively charged black particles and the two types of the particles are dispersed in a clear and colorless solvent in which red non-charged or slightly charged particles are dispersed.

In FIG. 5a, there is a positive driving voltage between the common electrode (503) and the pixel electrode (504). As a result, the positively charged white particle would move to be near or at the common electrode (503) and the negatively charged black particles would move to be near or at the pixel electrode (504), causing a white color to be seen at the viewing side.

In FIG. 5b, there is a negative driving voltage between the common electrode (503) and the pixel electrode (504). As a result, the negatively charged black particle would move to be near or at the common electrode (503) and the positively charged white particles would move to be near or at the pixel electrode (504), causing a black color to be seen at the viewing side.

Figure 6:
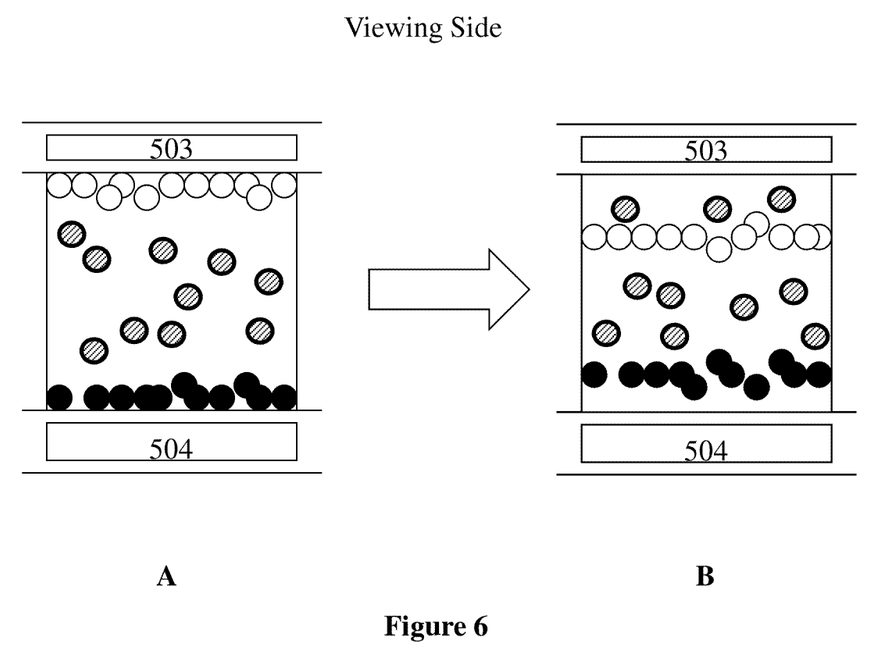
FIG. 6 illustrates how a red color state may be displayed in the alternative embodiment.

FIG. 6 illustrates how the red color state may be displayed. In driving to the red color state, the sequence may start at A (same as FIG. 5a) where the positively charged white particles are at the top and the negatively charged black particles are at the bottom. This is then followed by applying a "low negative driving voltage", in B, to move the positively charged white particles away from the top and towards the middle of the display cell, as shown. The incoming light, in this case, passes through the red fluid first and then is reflected by the white pigment particles; therefore the incoming light in fact passes through the red fluid twice (on its way in and out). A more intense red color is therefore seen from the viewing side.

Similar to the embodiment described above, the low driving voltage referred to above is typically about 1% to about 20% of the full driving voltage. The driving sequence of FIG. 4 is also applicable to this embodiment.

The word "about", throughout this application, is intended to mean ±5% of an indicated value.

FIG. 7 illustrates how multiple colors are displayed with a display device of the present invention. Each display cell represents a sub-pixel and each pixel has three sub-pixels. The three display cells, each representing a sub-pixel, are filled with display fluids of red, green and blue color, respectively.

Figure 7A:
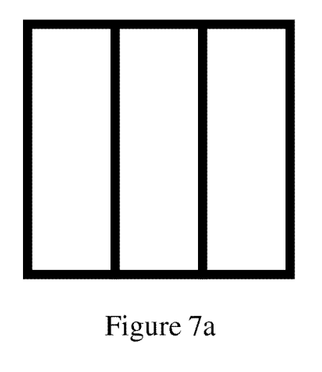
FIGS. 7a-7e illustrate how multiple colors are displayed with a display device of the present invention.
Figure 7B:
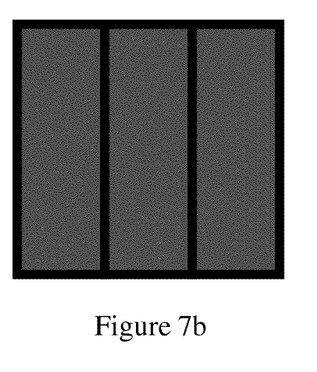
Figure 7C:
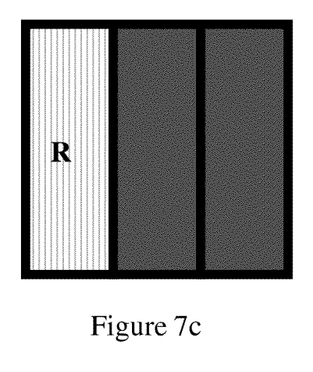
Figure 7D:
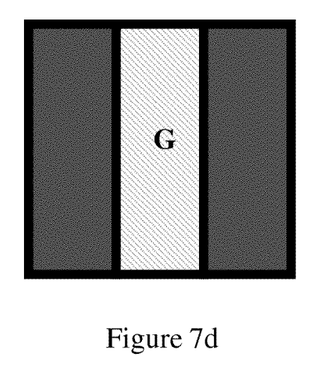
Figure 7E:
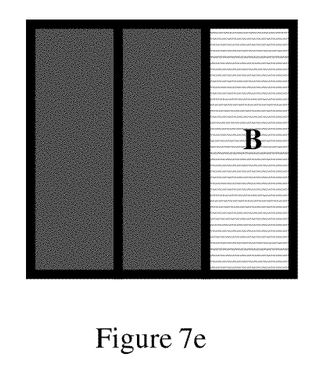

In FIG. 7a, when a white pixel is desired, all three sub-pixels are turned to the white color state. In FIG. 7b, when a black pixel is desired, all three sub-pixels are turned to the black color state. In FIG. 7c, when a red color is desired, one of the sub-pixels is turned to red (pigment particles are driven to the middle level of the display fluid, as shown, for example, in FIG. 3, 4 or 6) and the remaining two sub-pixels are turned to the black state for maximum color saturation. Similarly, FIG. 7d and FIG. 7e display the green and blue colors respectively. Alternatively, in FIGS. 7c, 7d and 7e, one of the sub-pixels is driven to the color state while the remaining two sub-pixels are driven to the white state for maximum brightness (at the expense of the color saturation). Further alternatively, in FIGS. 7c, 7d and 7e, one of the sub-pixels is driven to the color state while the remaining two sub-pixels are driven to the black and white states respectively.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A method for driving a color display comprising display cells sandwiched between a common electrode and pixel electrodes, wherein each of the display cells is filled with an electrophoretic fluid comprising two types of charged particles and one type of non-charged or slightly charged colored particles dispersed in a solvent, and the two types of charged particles carry opposite charge polarities and are of two contrast colors;

the method comprising applying a driving voltage between the common electrode and a pixel electrode to drive the electrophoretic fluid in an area corresponding to the pixel electrode to display the color of the non-charged or slightly charged colored particles, wherein the driving voltage is 1 to 20% of a full driving voltage required to drive the two types of charged particles to be near or at the common electrode or the pixel electrodes.

2. The method of claim 1, wherein said two types of charged particles are white and black charged particles carrying opposite charge polarities.

3. The method of claim 1, wherein the color of the non-charged or slightly charged colored particles is non-black and non-white.

4. The method of claim 1, wherein the color of the non-charged or slightly charged colored particles is red, green or blue.

5. The method of claim 1, wherein the two types of charged particles have different degrees of mobility.

6. The method of claim 1, wherein the two types of charged particles have similar mobility.

7. The method of claim 1, wherein said display cell is microcup-based.

8. The method of claim 1, wherein said display cell is microcapsule-based.

9. The method of claim 1, wherein color of the non-charged or slightly charged colored particles is the same color in all display cells.

10. The method of claim 1, wherein colors of the non-charged or slightly charged colored particles are different in display cells.

* * * * *